United States Patent [19]

Ryder et al.

[11] Patent Number: 4,939,945
[45] Date of Patent: Jul. 10, 1990

[54] GEARBOX DRIVE SYSTEM WITH PLASTIC OUTPUT GEAR

[75] Inventors: Francis E. Ryder; Stephen P. Lisak, both of Arab, Ala.

[73] Assignees: Ryder International Corp., Arab, Ala.; Textron Inc., Providence, R.I.; a part interest

[21] Appl. No.: 337,298

[22] Filed: Apr. 13, 1989

[51] Int. Cl.⁵ .................. B60Q 1/06; F16H 25/24; F16H 1/14

[52] U.S. Cl. .................. 74/89.13; 74/89.15; 74/417; 74/424.8 R; 74/DIG. 10; 362/66; 362/427; 403/375

[58] Field of Search .................. 74/89.13, 89.15, 417, 74/423, 424.8 R, DIG. 10, 459.5; 362/66, 427; 403/375

[56] References Cited

U.S. PATENT DOCUMENTS

| | | | |
|---|---|---|---|
| 2,861,462 | 11/1958 | Hussar | 74/423 |
| 2,873,612 | 2/1959 | Schneidewind | 74/89.13 |
| 2,964,961 | 12/1960 | Gulick | 74/424.8 VA X |
| 4,271,456 | 6/1981 | Dick | 362/66 |
| 4,309,740 | 1/1982 | Takata | 362/66 |
| 4,419,721 | 12/1983 | Gregorie et al. | 362/368 |
| 4,524,407 | 6/1985 | Igura | 362/66 |
| 4,574,334 | 3/1986 | Igura | 362/66 |
| 4,649,764 | 3/1987 | Meade | 74/89.15 |
| 4,665,469 | 5/1987 | Furfari et al. | 74/89.13 |
| 4,674,018 | 6/1989 | Ryder et al. | 362/424 |
| 4,703,399 | 10/1987 | Van Duyn et al. | 362/66 |
| 4,708,318 | 11/1987 | Simo | 403/375 X |
| 4,713,739 | 12/1987 | Ryder et al. | 362/424 |
| 4,774,639 | 9/1988 | Baur et al. | 362/66 |

FOREIGN PATENT DOCUMENTS

| | | | |
|---|---|---|---|
| 2640737 | 3/1978 | Fed. Rep. of Germany | 74/417 |
| 1170023 | 1/1959 | France | 74/423 |
| 2109082 | 5/1983 | United Kingdom | 362/66 |

Primary Examiner—Allan D. Herrmann
Attorney, Agent, or Firm—Trexler, Bushnell, Giangiorgi & Blackstone, Ltd.

[57] ABSTRACT

An adjustment gear mechanism utilizing a plastic adjustment gear and integrally formed structures which securely retain a drive member. The plastic gear is formed to provide both a gear tooth arrangement which cooperatively meshes with a drive gear and an integrally formed adjustment member bore which provides prevailing torque for an adjustment member. The gear tooth arrangement on the plastic gear is formed to cooperatively mesh with a metal drive gear and withstand the tooth load and deflection applied by the metal drive gear. The drive member is non-adhesively retained by the integrally formed structures which maintain operative engagement between the drive member and the drive gear which it rotates. The structure and materials of the mechanism also provide adjustment-retaining purchase such that when a desired adjustment is achieved using the adjustment mechanism the adjustment resists disturbance by accidental, vibrational or other forces exerted upon either the drive member or the adjustment member.

23 Claims, 4 Drawing Sheets

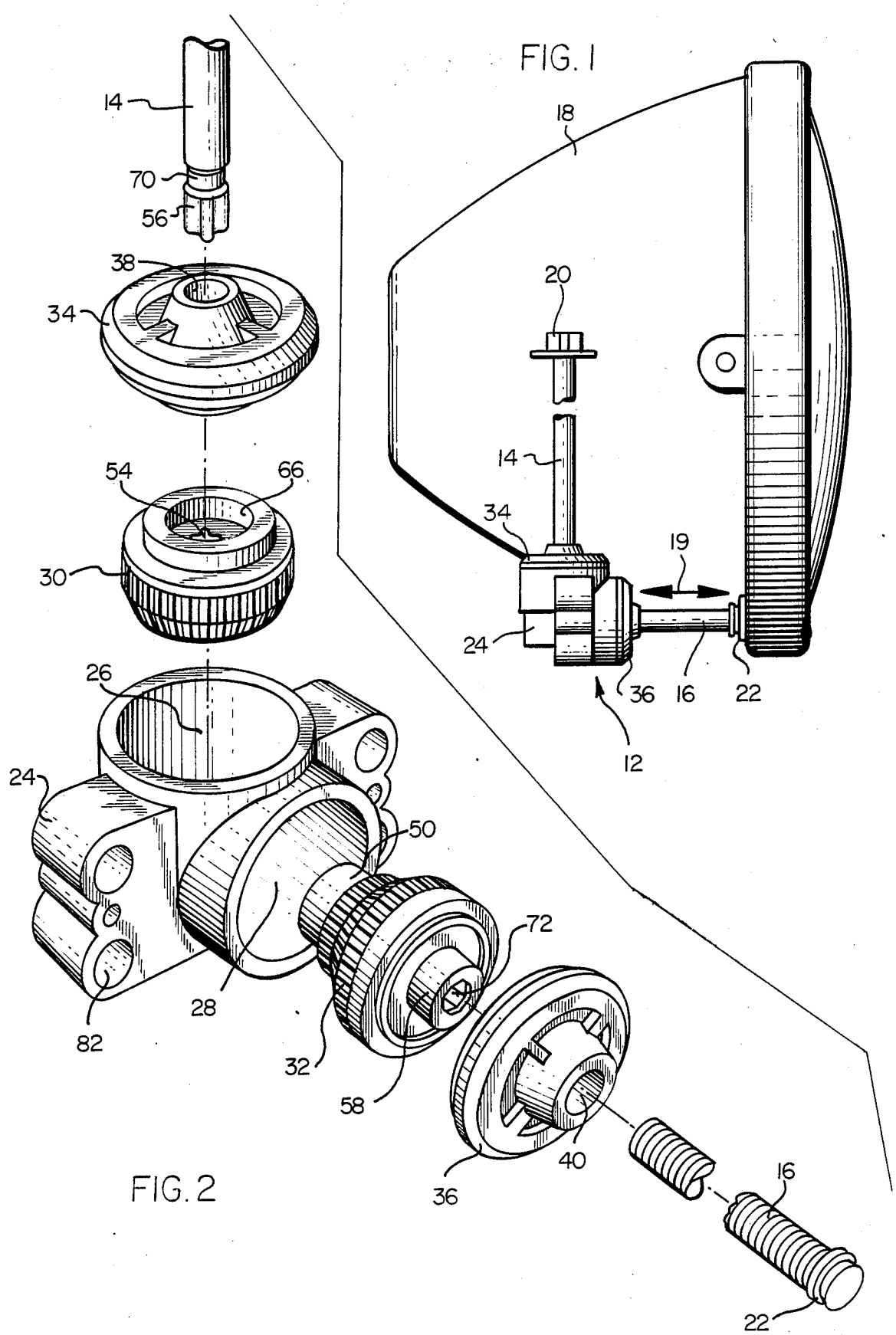

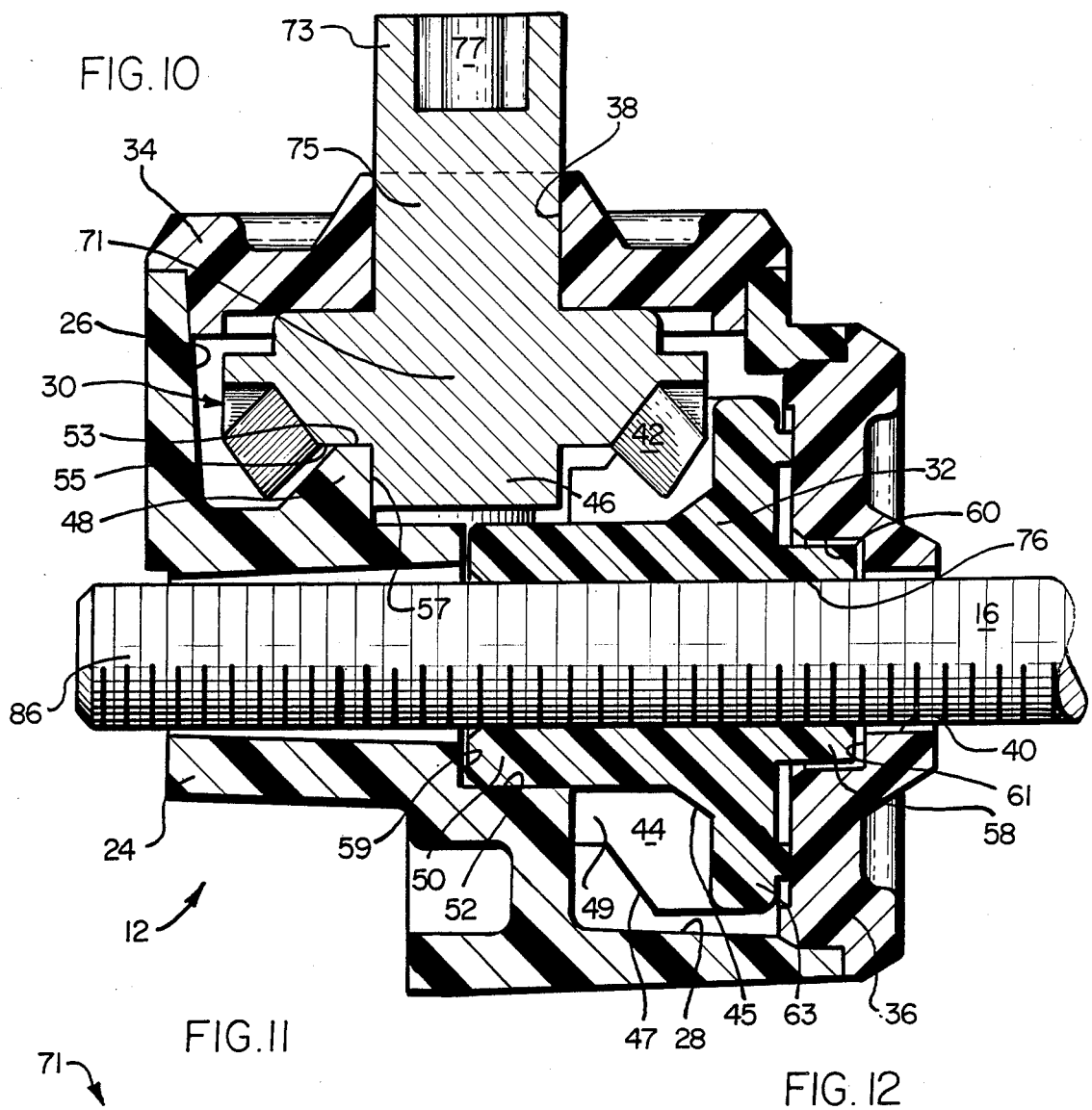
FIG. 10
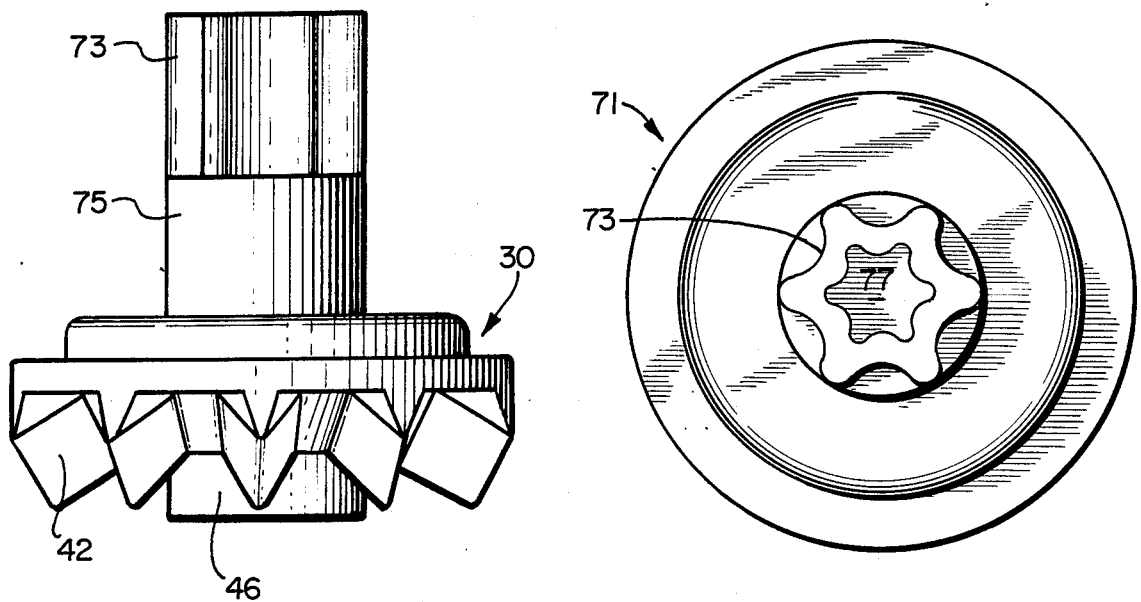
FIG. 11
FIG. 12

GEARBOX DRIVE SYSTEM WITH PLASTIC OUTPUT GEAR

BACKGROUND OF THE INVENTION

This invention relates generally to the automotive arts and more particularly to an adjusting mechanism for an automobile headlamp assembly. Still more particularly, the invention relates to a novel and improved adjusting mechanism employing a plastic adjustment gear and a drive member retaining arrangement.

Mechanisms for vertical and horizontal adjustment or "aiming" of automobile headlamps have been provided for sealed beam-type automotive headlamps for some time. Generally speaking, such headlamps were individually adjustable with independent adjusting screws or the like, by driving the same with a suitable mating tool. often, these adjusting screws were accessible only with difficulty or upon time consuming removal of certain trim or bezel components of the headlamp assembly. Problems have been encountered in that these adjusting screws became corroded or otherwise fouled with rust and/or road grime, rendering the adjustment procedure inordinately time-consuming and difficult, or necessitating removal and replacement of a number of parts.

With the introduction of composite headlamp assemblies, and to overcome the aforementioned problems, novel types fo adjusting mechanisms have been utilized which mount interiorly of the vehicle and can be easily and readily operated to adjust vertical and/or horizontal positioning or "tilting" of the headlamps to achieve the desired aiming thereof. Such a mechanism is independent of the headlamp members or other headlamp assemblies, such that it could be used with any of a wide variety of different headlamp sizes, shapes and configurations as well as other inaccessible devices needing adjustments, interchangeably.

While the art has developed a bevel gear configuration which transposes vertically applied rotational input to create a linear horizontal adjustment and the art has refined the general configuration of the adjustment mechanism, those skilled in the art generally have been unsuccessful in implementing a plastic gear configuration. It was heretofore generally accepted that attempts at utilizing plastic gears would fail due to the high tooth load and deflection which is applied to the gears in this application, to overcome the prevailing torque that must be built into each assembly to assume the headlamp remains in position once adjusted.

However, we have found that the use of plastic for the adjustment mechanism gears is highly desirable for reasons of both economy and perfomance. Plastic is suitable especially for the output gear because the output gear will then produce or create the prevailing torque on the output adjustment member, a threaded screw member, to prevent it from moving or being moved out of adjustment. The metal gears used in the prior art adjustment mechanism arrangements usually require an additional supplementary frictional means which assist in retaining the desired adjustment achieved through utilization of the adjustment mechanism.

Presently available adjustment mechanisms utilize a drive gear in cooperation with an adjustment gear, both gears being bevel gears formed of metal. To help retain the desired adjustment once it is set, the adjustment gear is formed to receive a plastic bushing inserted through the center. It is the threading of the adjustment member into this plastic bushing which provides the prevailing torque on the output member screw to prevent the mechanism from changing its adjustment due to mechanical vibration or impact. In this regard the plastic brushing is initially unthreaded, and the engagement of the threaded output member therewith deforms the plastic material to provide a mating female thread. As can be appreciated this thread forming operation produces high frictional flank-to-flank engagement, that achieves the desired prevailing torque.

The problem with the use of a plastic bushing inside the metal adjustment gear is that is creates additional parts to be manufactured, monitored, warehoused and assembled and provides another component of the overall assembly which could be flawed or fail thereby reducing the reliability of the overall assembly.

It was heretofore believed impossible to utilize plastic gears in this arrangement because the teeth of the plastic gears failed under the applied torque, such that the teeth deflected or were sheared off due to the extreme load. Further, it was also though that the molding problem one would encounter with a plastic gear would render such a gear type uneconomical. However, the present invention has now solved the problems of using plastic gears in such an adjustment mechanism.

As an additional matter, this type of adjustment mechanism requires an adjustment drive member to be positively maintained attached to the drive gear which is retained within the gear housing. Prior art mechanisms have retained this drive member in place by adhesively attaching one end of the drive member into a recepatacle formed in the surface of the drive gear. While the adhesive was theoretically capable of retaining the drive member many problems were created. First, too much adhesive resulted in the adhesive overflowing the drive member receptacle and flowing between the drive gear teeth and the adjustment gear teeth or into other parts of the assembly thereby interfering with the operation thereof. Second, too little adhesive resulted in the shaft coming loose from the shaft retaining receptacle thereby requiring reaffixing or replacing the drive member.

The present invention, as will be detailed more fully hereinafter, overcomes the above-described problems. More specifically, the present invention provides a novel and improved headlamp adjustment mechanism utilizing a plastic gear arrangement which also nonadhesively retains an adjustment drive member.

OBJECTS AND SUMMARY OF THE INVENTION

A general object of the present invention is to provide an improved adjustment mechanism which utilizes a one piece plastic gear on the output gear of an adjustment mechanism.

Another object of the present invention is to provide a one piece plastic adjustment gear combining a bevel gear with an integrally formed adjustment member bore whereby the plastic material surrounding the adjustment member bore provides the prevailing torque for an adjustment member threadedly inserted therethrough.

A more specific object of this invention is to provide a one piece plastic adjustment gear, the gear teeth of which are formed to cooperatively mesh with a nonplastic rigid drive gear such that the gear teeth for the plastic adjustment gear withstand the tooth load and deflection imposed upon it by the drive gear.

A further object of the present invention is to provide an adjustment mechanism which is formed with drive member securing means which non-adhesively retains a drive member in engagement with the adjustment mechanism.

Yet a further object of the present invention is to provide an adjustment mechanism which achieves retention of a desired adjustment using only the essential components of the adjustment mechanism and not requiring supplementary frictional devices.

In accordance with the foregoing, the present invention comprises a novel and improved adjustment gear mechanism utilizing a plastic adjustment gear and a drive member securing means. The plastic gear is formed to provide both a gear tooth arrangement which cooperatively meshes with a drive gear and an integrally formed adjustment member bore to produce the prevailing torque for an adjustment member. The gear tooth arrangment on the plastic gear is formed to cooperatively mesh with a metal gear such that the plastic gear teeth are capable of withstanding the tooth load and deflection applied by the non-plastic rigid drive gear. A drive member is non-adhesively retained by integrally formed drive member retaining means which maintain operative engagement between the drive member and the drive gear which it rotates.

BRIEF DECRIPTION OF THE DRAWINGS

The features of the present invention which are believed to be novel are set forth with particularity in the appended claims. The orgainization and manner of the invention, together with the further objects and advantages thereof, it best be understood by reference to the following description taken in connection with the accompanying drawings in which like reference numerals identify like elements, and in which:

FIG. 1 is a side elevational view showing the adjustment mechanism of the invention mounted to a headlamp for adjusting the tilt of the headlamp by rotating a vertically oriented drive member;

FIG. 2 is an exploded perspective view illustrating the assembly configuration of the constituent parts of the adjustment mechanism of FIG. 1;

FIG. 10 is a partial sectional view of an alternative embodiment of the adjustment mecahanism taken along the rotational axis of the bevel gears showing a cast unitary drive gear and shaft retained within the unitary adjustment mechanism housing;

FIG. 11 is a side elevation view of the cast unitary drive gear and shaft as illustrated in FIG. 10; and FIG. 12 is a plan view of the case unitary drive member and drive gear illustrated in FIG. 11 showing the co-radial arrangement of the multi-lobular drive member portions.

Figure 3:
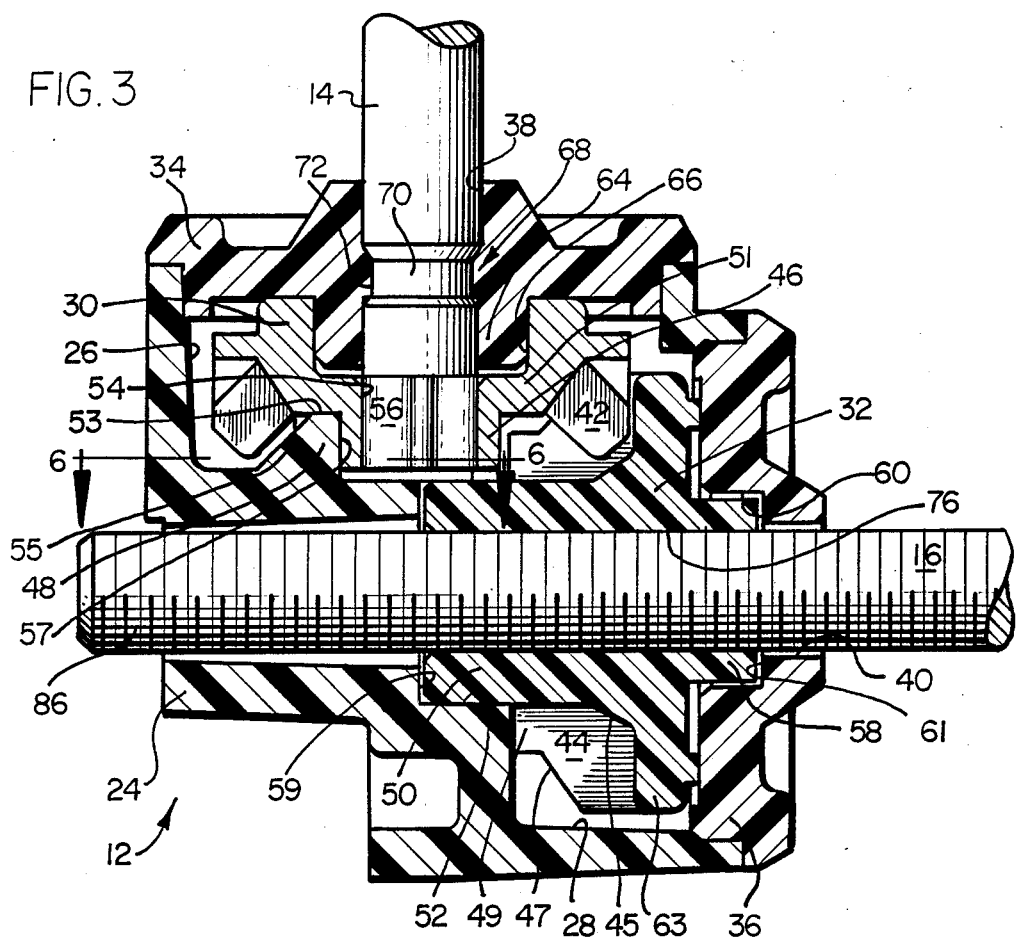
FIG. 3 is a partial sectional view of the adjustment mechanism taken along the rotational axis of the bevel gears retained within the unitary adjustment mechanism housing.

It should be noted that the dimensional relationships between members of the illustrated embodiment may vary in practice and may have been varied in the illustrations to emphasize certain features of the invention.

DETAILED DESCRIPTION OF THE ILLUSTRATED EMBODIMENT

While this invention is susceptible to embodiment in many different forms, there is shown in the drawings, and will be herein described in detail one specific embodiment with the understanding that the present disclosure is to be considered an exemplification of the principles of the invention, and is not intended to limit the invention to the embodiment illustrated.

While the present invention may have applications other than the adjustment of headlamps or the like, the ensuing description will be facilitated by specific reference to the problem of adjustment of automobile headlamps.

FIG. 1 is an illustration of a typical headlamp arrangement wherein an adjustment mechanism 12 has a drive member 14 and an adjustment member 16 affixed to the lamp body which cooperatively operate to adjust a headlamp 18 in the verticle plane. The vertically oriented drive member 14 has a tool receiving head portion 20 formed at its top-most end. The drive member 14 is rotatable about its vertical axis by applying a torque to head portion 20 using a torque inducing tool such as a wrench or screw driver or some other source of rotational force (not shown). At the distal end of the adjustment member 16 an attaching portion 22 non-rotatively connects the adjustment member 16 to a surface of the headlamp 18. Both the drive member 14 and the adjustment member 16 project into a housing member 24 of the adjustment mechanism 12 and attach to a mechanism disposed therein which transforms rotational force applied to the drive member 14 into generally linear movement of the adjustment member 16, indicated by arrow 19. As shown in FIG. 1, the adjustment mechanism 12 permits remote control of the headlamp 18 or any other body thereattached.

An exploded perspective view of the adjustment mechanism 12 is shown in FIG. 2 illustrating the assembly configuration of the constituent parts which interact to translate rotational force supplied to the drive member 14 into generally linear movement of the adjustment member 16. The housing member 24 is formed with a first gear bore or drive gear bore 26 and a second gear bore or adjustment gear bore 28. These gear bores 26, 28 generally intersect within the housing member 24. The drive gear bore 26 and adjustment gear bore 28 are dimensioned and formed for receiving a dirve gear 30 and an adjustment gear 32, respectively. Gear teeth are formed on the drive gear 30 and the adjustment gear 32 which generally mesh at the intersection of the drive gear bore 26 and the adjustment gear bore 28. A drive gear cap 34 and an adjustment gear cap 36 cover the drive gear bore 26 and adjustment gear bore 28, respectively, to protect the drive gear 30 and adjustment gear 32 disposed within the respective gear bores 26, 28 from undesirable environmental elements and effects, and also serve to journal said gears and maintain their position with the housing 24. The drive gear caps 34, 36 are retained in position covering the respective gear bores 26, 28 by cap retaining means (not shown) integrally formed on each of the caps 34, 36 and the corresponding bores 26, 28. Retention of the gear caps 34, 36 is achieved by either integrally forming a cooperative annular ring and groove on the outer diameter of the gear cap and the inner diameter of the respective bore, or by ultrasonically welding the gear cap to the abutting material of the respective bore. The illustrated embodiment employs the ultrasonic method of attaching the gear caps 34, 36 to the housing member 24 to cover the respective gear bores 26, 28.

The drive gear cap 34 and the adjustment gear cap 36 have formed therethrough a drive member aperture 38 and an adjustment member aperture 40 for receiving the drive member 14 and the adjustment member 16, respectively. In order to maintain the adjustment mechanism 12 in a sealed configuration, the fit between the drive member 14 and the adjustment member 16 and the respective apertures 38, 40, generally is such as to prevent the passage of moisture and particles which could damage the gears 30, 32 disposed therein. However, the drive member is rotatable relative to drive member aperture 38 and the adjustment member is axially movable relative to aperture 40. As will be presented in greater detail hereinbelow, the drive member 14 and the adjustment member 16 are cooperatively engaged with the drive gear 30 and the adjustment gear 32, respectively.

FIG. 3 provides a partial sectional view of the adjustment mechanism 12 taken along the rotational axis of the bevel gears 30, 32 retained within the mechanism housing 24. While the bevel gears 30, 32 are shown as miter gears having a 45° pitch angle therebetween, the gears are configurable to a variety of desired angles in order to achieve a desired direction of linear motion or to allow a desired direction of rotational input. Drive gear teeth 42 and adjustment gear teeth 44 are shown in meshed engagement at the intersection of the drive gear 30 and the adjustment gear 32. The gear tooth configuration of the bevel gears 30, 32 permits the gear teeth 42, 44 to deeply intimately engage one another. As shown, the drive gear tooth 42 projects deeply into the dedendum between the adjustment gear teeth 44 nearly contacting a root portion 45 of the adjustment gear 44. As shown in the lower side of the adjustment gear 32, the gear tooth 44 is formed with a sloping tooth face 47 and a buttress portion 49. The sloping tooth face 47 is angled to permit deep drive gear - adjustment gear 30, 32 engagement while maintaining a drive gear body thickness 51 appropriate to maintain the structural integrity of the drive gear 32.

Also shown in FIG. 3, are cooperative structures formed in the housing 24, caps 34, 36 and bevel gears 30, 32 which help to retain the bevel gears 30, 32 in proper alignment and provide additional position-retaining purchase between the abutting surfaces. An integrally formed drive gear bushing 46 extends downwardly away from the drive gear 30 into a drive gear journalling rim portion or journalling rim portion 48. As will be shown in greater detail in FIG. 6, the journalling rim portion 48 extends more than halfway around the circumference of the drive gear bushing 46 to help retain and support the drive gear 30. Specifically, the drive gear 30 has a face portion 53 which rests on top of a top portion 55 of the journalling rim portion 48. It is on this top portion 55 of the journalling rim portion 48 which the drive gear 30 rests. Formed in the center of the journalling rim portion is a drive gear counterbore 57 into which the drive gear bushing 46 projects.

In the drive gear portion of the adjustment mechanism 12, a drive gear cap hub 64 is formed on the inwardly facing surface of the drive gear cap 34 and cooperatively mates with a hub-receiving bore 66 which is formed in the upwardly facing surface of the drive gear 30. The drive gear hub 64 and bore 66 are vertically coaxial with the drive gear bushing 46, journalling rim 48 and drive gear counterbore 57. These structures, with their respective abutting surfaces cooperate to maintain the drive gear 30 in proper axial alignment and provide adjustment-retaining purchase due to the frictional contact between the abutting surfaces.

Similarly, the adjustment gear 32 is formed with adjustment gear bushings 50 and 58 which extend into adjustment gear counterbores 52 and 60 respectively. The bushings 50, 58 are horizontally coaxial and retain the adjustment gear 32 in proper axial alignment and further provide adjustment retaining purchase due to the frictional contact of the abutting surfaces. Also, the adjustment gear 32 is horizontally compressively retained between the opposing counterbore face surface 59 and cap counterbore face surface 61. The ends of the adjustment gear bushings 50, 58 abut these opposing face surfaces 59, 61, respectively thereby preventing horizontal play of the adjustment gear 32 while disposed within the mechanism housing 24.

The drive gear bushing 46 has formed therein a drive member engaging recess 54 which is formed to cooperatively receive a drive member head 56 which is formed on the end of the drive member 14 and which projects through the aperture 38 in the drive gear cap 34. The drive member head 56 and the drive member engaging recess 54 are shown to be of an appropriate hexlobular configuration, which those skilled in the art will recognize as corresponding to the TORX ® brand drive system. The drive member 14 projects downwardly through the drive member aperture 38 formed in the drive member cap 34 with its distal end formed with the drive member head 56 to cooperatively mate with the drive member engaging recess 54 formed in the drive gear 30.

Drive member end 56 is retained in cooperative engagement with the drive member engaging means 54 by drive member securing means 68. In the illustrated embodiment, as shown in FIG. 3, the drive member securing means 68 is comprised of an annular groove 70 formed on the outer circumference of the drive member 14 and a corresponding cooperatively mating annular ring 72 which is formed on the internal surface of the drive member aperture 38 formed through the drive gear cap 34. Alternatively, the annular ring 72 may be formed on the outer circumference of the drive member 14 and the corrresponding annular groove 70 may be formed on the internal surface of the drive member aperture 38 formed through the drive gear cap 34 without departing from the invention.

In another alternative embodiment within the scope of the invention (not shown) a plurality of serrated retaining rings may be integrally formed on the circumferential surface of the drive member 14 which are shaped to facilitate insertion, but oppose removal, of the drive member 14 relative to the drive gear cap 34. The serrations would have a zero pitch angle, so that the serrations would not threadedly move the drive member 14 when a rotational force is applied to the drive member 14.

Yet another alternative embodiment of engaging the drive member with the drive gear 30 is shown in FIG. 11. In FIG. 11, the drive member 14 is integrally cast with the drive gear as a single piece such that the drive member securing means is obviated. This configuration eliminates the need for a variety of drive gear mechanism 12 having a range of drive member 14 lengths reducing the number of parts needed in the present invention by providing a universal one-piece drive gear and shaft. However, this universal single piece drive member 14 and drive gear 30 requires some minor modifications to the drive gear cap 34 and provides additional advantages which will be further described hereinbelow in a discussion of FIGS. 10 through 12.

Figure 4:
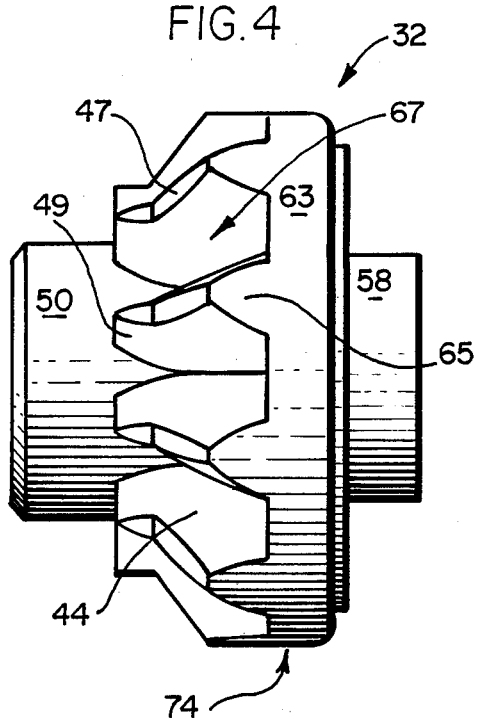
FIG. 4 is a side elevation view of a plastic adjustment gear used in the adjustment mechanism.
Figure 5:
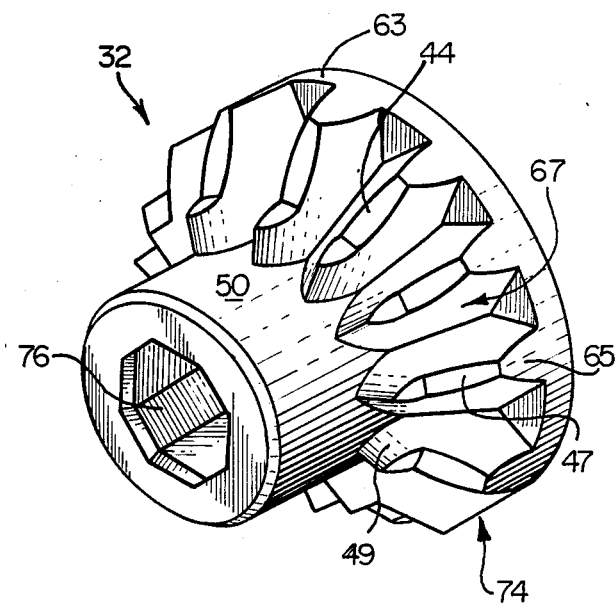
FIG. 5 is a perspective view of the plastic adjustment gear used in the adjustment mechanism.

The shape and dimensions of the tooth configuration of the plastic adjustment gear is of great importance to the sucess in implementing a plastic adjustment gear in the adjustment mechanism of the present invention. As such, FIGS. 4 and 5 provide an enlarged side view and perspective view, respectively, of the adjustment gear 32 as used in the adjustment mechanism 12. The adjustment gear 32 has a touch bevel gear portion 74 integrally formed with the gear bushings 50, 58. The individual gear teeth 44 are connected at one end to the bushing 50 and at the other end to a rim 63. Additional strength is provided by integrally forming the gear teeth 44 between and connected to these two structures 50, 63. Additional, each end of the gear teeth 44 abutting the rim 63 have a flared face portion 65 which has a broad base formed along the rim 63 which narrows towards the crest of the gear tooth 44. The same broad tooth feature is incorporated at the buttress 49 end of the gear tooth where the gear tooth 44 meets the bushing 50.

As noted above, the buttress portion 49 provides additional strength by providing additional material in an area which has generally been notched back to accommodate the drive gear tooth 42. An area 67 formed between the adjustment gear teeth 44 is shaped to provide maximum drive gear tooth 42 penetration and engagement. By providing for deep penetration of the drive gear into the area 67 between the adjustment gear teeth 44, more of the load is applied towards the thicker base portion of the tooth of the adjustment gear tooth 44. Transfer of the load from the deeply engaged drive gear teeth 42 to the adjustment gear teeth 44 reduces the pitch circle of the adjustment gear 32 thereby applying more of the driving force to the portion of the gear 32 which is constructed to be less susceptible to deflection.

FIG. 5 provides a perspective view of the plastic adjustment gear 32 further illustrating the gear tooth 44 configuration and the tooth strengthening and reinforcing structures. As shown in FIG. 5, the integrally formed gear teeth 44 are securely retained between the rim 63 and the busing 50. The crest or tooth face 47 is formed to be as broad as possible to provide the maximum strength of the gear tooth 44 and to minimize potential deflection induced by an engaged drive gear 30. An adjustment gear bore 76 is integrally formed through the center of the bushing 50, 58 to cooperatively engage the adjustment member 16 which projects therethrough. The integrally formed adjustment bore 76 is octogonally shaped such that when a thread forming adjustment member 16 is threaded therethrough, the plastic material which is displaced by the threads on the adjustment member 16 has areas in which to flow. Alternatively, the adjustment member bore 76 is formed with threads which cooperatively mate with the threads formed on the adjustment member 16. In either emobodiment, it is the material surrounding the integrally formed adjustment member bore 76, and the threads either provided or created therein, which provide the prevailing torque for the adjustment member 16 thereby tending to retain the adjustment member 16 in the desired adjustment.

Figure 6:
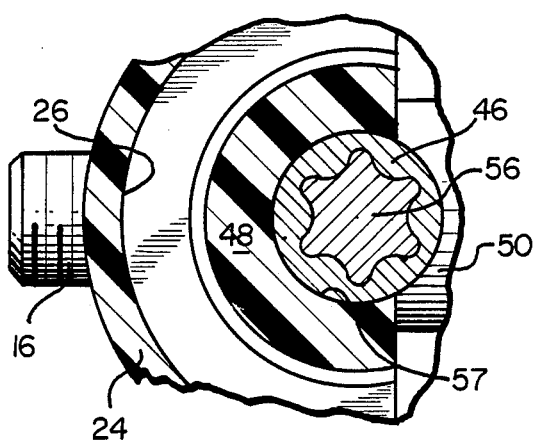
FIG. 6 is a sectional view taken along the line 6–6 of FIG. 3 showing a plan view of the drive gear journalling rim portion.

FIG. 6 provides a sectional view taken along the line 6—6 of FIG. 3 showing a plan view of the drive gear journalling rim portion 48. The drive gear bushing 46 projects into the counterbore 57 which is formed through the journalling rim portion 48. The journalling rim portion 48 surrounds more than half of the circumference of the drive gear bushing 46 to securely rotatably retain the drive gear 30 in the horizontal plane.

Figure 7:
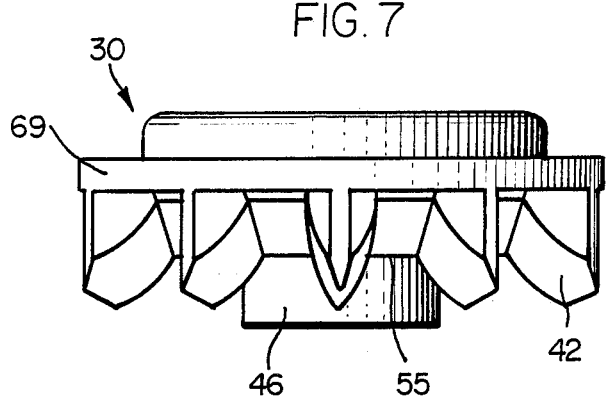
FIG. 7 is a side elevation view of a non-plastic drive gear used in the adjustment mechanism.
Figure 8:
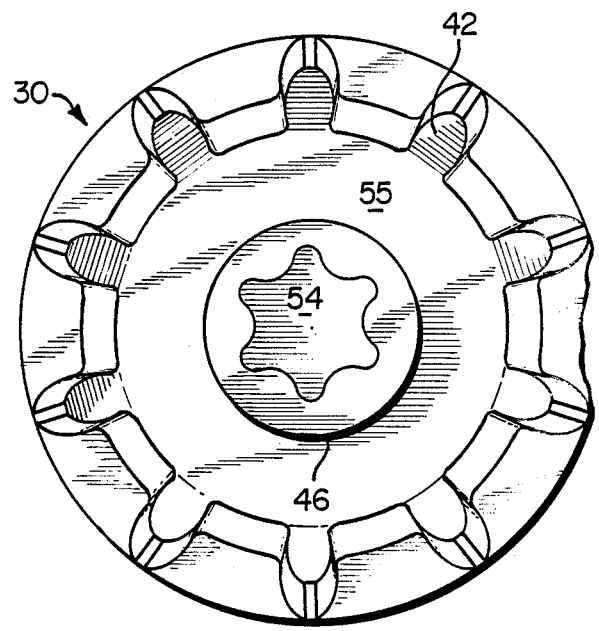
FIG. 8 is a plan view of the non-plastic drive gear used in the adjustment mechanism showing the tooth configuration of the drive gear and the drive member receptacle which is formed concentric with the drive gear.

FIGS. 7 and 8 show a side view and a plan view, respectively, of the drive gear 30 used in the adjustment mechanism 12. The side view illustrated in FIG. 7 shows the drive gear teeth 42 integrally formed between a rim 69 and the drive gear bushing 46 formed in the center of the gear tooth arrangment.

The plan view illustrated in FIG. 8 is viewed from the drive gear bushing 46 end of the drive gear 30. Shown in the center of this view is the drive gear engaging means 54 which, for the illustrated embodiment, is a receptacle in a TORX® shape which corresponds to a male TORX® shape formed on the distal end of the drive member 14. The gear teeth 42 are formed to project angularly downward and away from the rim 69 and hub 46 to cooperatively mate in deep engagement with the area 67 formed between adjustment gear teeth 44. Also shown in FIGS. 7 and 8 is the drive gear face portion 53 which abutts the top 55 of the journalling rim portion 48 on which the drive gear 30 is positioned.

Figure 9:
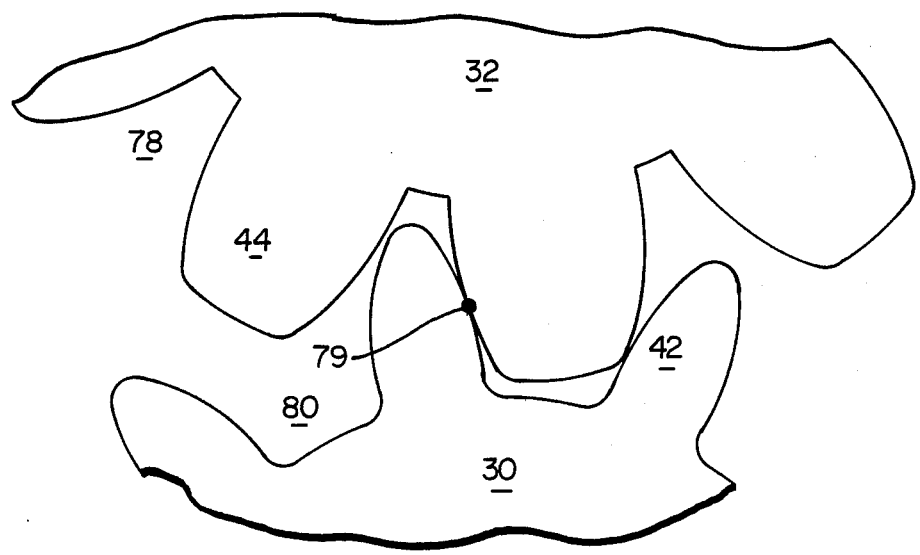
FIG. 9 is an enlarged view of the drive gear and adjustment gear meshing, showing the deep crest and root engagement of the respective gear teeth and the relatively smaller size of the drive gear compared to the adjustment gear teeth.

FIG. 9 provides an enlarged view of the drive gear teeth 42 and the adjustment gear teeth 44 meshedly engaged.

As illustrated, the two sets of bevel gear teeth 42, 44 cooperatively intermesh with each other in generally deep tooth engagement such that the crest of one tooth penetrates nearly to the root of the cooperatively engaging dedendum of the opposing gear. The adjustment gear teeth 44 are at least one and a half times the width of the drive gear teeth 42. Correspondingly, the drive gear dedendum 80 are approximately one and a half times the size of the adjustment gear dedendum 78 providing cooperative intermeshing of the drive and adjustment gears 32, 30. It should be noted that the drive gear 30 and the adjustment gear 32 illustrated in FIG. 9 are the bevel gears as shown in the previous figures and not spur gears as they may appear to be from this simplified illustration. The adjustment gear 32, as previously mentioned, is a single piece integrally formed of plastic and the drive gear 32 is a single piece integrally cast of metal.

FIG. 9 further illustrates the structural advantages gained by the relatively thicker adjustment gear tooth 44. An adjustment gear tooth 44 is shown engaging a drive gear tooth 42 at a point 79 at the tangential intersection of the pitch lines of the gears. At this point 79 the tangential tooth pressure created by the teeth 42, 44 acting on each other is the greatest throughout the engagement cycle. The thickness of the adjustment gear tooth 44 is calculated to resist the load applied to it by the drive gear tooth 42.

While the adjustment gear teeth 44 as shown in the illustrated embodiment are approximately one and a half time the size of the drive gear teeth 42, a general ratio, within the scope of the present invention, can be used to determine the size of the adjustment gear and drive gear teeth 42, 44.

The size ratio of the adjustment gear teeth 44 to the drive gear teeth 42 depends on the properties of the materials used, however, a general upper limit and general lower limit can be determined. The general upper limit of the size of the adjustment gear teeth 44 is determined by the minimum thickness of the drive gear teeth 42 which can transfer torque to the adjustment gear 44 without the drive gear teeth 42 being unacceptably deflected. The general lower limit is based on the minimum thickness of the adjustment gear teeth 44 capable of receiving an applied torque by the drive gear 32 without unacceptable deflecting the adjustment gear teeth 44.

It will be appreciated from the foregoing descriptions that this ratio covers a broad range of gear tooth sizes depending upon the materials used. As previously mentioned, the belief in the prior art was that any attempt to utilize a plastic gear in an adjustment mechanism of the present invention would fail. Surprisingly then, the present invention provides an adjustment mechanism 12 which utilizes a metal drive gear 32 and a plastic adjustment gear 30. Aternative materials can be used for the metal drive gear 32 without departing from the invention, as long as the drive gear 32 is a generally rigid material.

FIG. 10 provides a partial sectional view of an alternative embodiment of the adjustment mechanism taken along the rotational axis of the bevel gears showing a cast unitary drive gear and shaft 71 retained within the adjustment mechanism housing 24. The unitary drive gear and shaft 71 is cast from a rigid material such as metal to eliminate the need to mechanically connect the drive member 14 to the drive gear 30. It should be obvious to one skilled in the art that this drive gear and shaft configuration is completely covered within the scope of the present invention. However, as will be appreciated from the description hereinbelow, utilization of an integrally cast drive gear and shaft 71 provides several benefits.

Primarily, the use of the integrally cast drive gear and shaft 71 eliminates the need for discrete drive gear 30 and shaft 14 components, thereby further reducing the number components utilized in the mechanism of the present invention. Structural integrity of the drive assembly is also enhanced such that the mechanical connection of the drive member head 56 (as shown in FIG. 3) is eliminated and therefore the potential for failure of this mechanical connection is eliminated. Further, the unitary drive gear and shaft 71 provides a standard adjustment mechanism driving head 73 thereby eliminating the need for variable lengthed drive members 14 and reducing the number and/or variety of components utilized in the mechanism of the present invention.

The following description will rely on comparitive reference to FIGS. 3 and 10. As shown in FIG. 3, the prevailing torque, which retains the mechanism in a desired adjustment, is formed between the following surface interfaces; the material along the adjustment gear bore 76 and threads 86 formed on the adjustment member 16, the outside surface of the cap hub 64 and the inwardly facing surface of the hub receiving bore 66, the outwardly facing surface of the drive member 14 projecting through the drive cap aperture 38 and the inwardly facing surface of the drive cap aperture 38, and the outwardly facing surface of the drive gear hub 46 and the inwardly facing surface of the hub bore 57. Clearly as illustrated in FIG. 10, the interface between the cap hub 64 and the hub receiving bore 66, as shown in FIG. 3, is absent from the embodiment utilizing the unitary drive gear and shaft 71. In this embodiment, the prevailing torque is provided between the outwardly facing surface of a shaft portion 75 of the unitary drive gear and shaft 71 and the inwardly facing surface of the cap aperture 38, as well as the other surface interfaces noted above. Further, torque is developed by compression of the drive gear portion 30 between the top surface of the drive gear journalling rim 48 and the downwardly facing inside surface of the drive gear bore cap 34. In either of the embodiments as illustrated in FIG. 3 or FIG. 10, sufficient prevailing torque is developed between abutting surfaces to retain the adjustment mechanism in a desired adjustment.

FIG. 11 provides a side elevation view of the cast unitary drive gear and shaft 71 as illustrated in FIG. 10. As shown in this view, the unitary member 71 is comprised of the drive gear hub 46, the multi-toothed drive gear 30, the shaft portion 75 and the drive head 73. By integrally casting these components as a unitary member 71, the diameter of the shaft portion can be increased compared to the drive member 14 as utilized in the embodiment of FIG. 3 since the shaft portion 75 is integrally formed of the same material of the drive gear 30 thereby eliminating the need for any mechanical connection therebetween. The increased diameter of the shaft portion 75 permits application of greater force to the drive gear 30. The drive head 73 is formed with a multi-lobular drive tool engaging shape.

As shown in greater detail in the plan view (FIG. 12) of the unitary drive gear and shaft 71, the multi-lobular drive head 73 is formed to cooperatively engage either a male drive tool, a female drive tool or a combination drive tool. As also shown in FIG. 10, a multi-lobular tool receiving receptacle 77 is formed in the center of the drive head 73 while the outside of the drive head has a multi-lobular shape which cooperatively engages a corresponding female drive tool. The lobes of these drive tool engaging features have been radially aligned so as to provide maximum wall thickness between the structures thereby enhancing the structural integrity of the drive head. If the lobes of these features were not radially aligned, the wall thickness would not be at its maximum throughout the drive head 73 and could result in material failure upon application of driving forces to the drive head 73.

In use, the adjustment mechanism 12 is comprised of a housing member 24 which has formed therein the first bore 26 and the second bore 28 formed for receiving the metal drive gear 30 and the plastic adjustment gear 32, respectively. The first gear bore 26 and the second gear bore 28 are sealed by the drive gear cap 34 and the adjustment gear cap 36, respectively. Each cap 34, 36 is formed with an aperture 38, 40 therethrough for receiving a corresponding member 14, 16. Also, the housing member 24 may have formed thereon integral mounting apertures 82 for receiving fastening supports which project therethrough or the housing member 24 can be formed with fastening means (not shown) which attach the housing to appropriate complementary fastening means.

The drive member 14 which projects through the drive member aperture 38 of the drive gear cap 34 cooperatively engages the drive member engaging means 54 formed in the upwardly facing surface of the drive gear 30. The drive member 14 is securely retained in cooperative engagement with the drive gear 30 by the drive member securing means 68 integrally formed on the drive member 14 and the drive member aperture 38. While the present invention teaches a non-adhesive means of securing the drive member 14 in cooperative engagement with the drive gear 32 of the adjustment mechanism 12 an appropriate adhesive means could also be substituted or used to complement the non-adhesive drive member engaging means 54. Alternatively, the drive gear 30 and drive member 14 are integrally cast in metal to provide a reduced number of parts, increased strength and greater reliability.

The adjustment member 16 has formed on its distal end the attaching portion 22 which attaches to the headlamp 18 or other object to be moved by the adjustment mechanism 12. The other end of adjustment member 16 projects through the adjustment member aperture 40 of the adjustment member gear cap 36 and threadedly engages the adjustment member bore 76 of the adjustment gear 32. The plastic adjustment gear 32 is preferably, although not necessarily, formed without threads and the adjustment member 16 is preferably, although not necessarily, formed with thread cutting threads 86 to provide more plastic penetration thereby providing more fit interference between the adjustment member 16 and the adjustment gear 32 and greater prevailing torque.

With the adjustment mechanism 12 assembled in the configuration as described in the above-detailed description, a rotational force is applied to the drive member 14 to rotate the drive gear 30. Upon exerting a force on the drive member 14 and rotating the drive gear 30, the meshedly engaged drive gear teeth 42 and adjustment gear teeth 44 transfer the exerted rotational force to rotate the adjustment gear 32. Rotation of the adjustment gear 32 engages the cooperatively threaded adjustment member bore 76 and adjustment member 16 such that rotation of the adjustment gear 32 linearly threadedly moves the adjustment gear 16. The rotational force applied to drive member 14 resulting in the transfer of that force to induce generally axially linear motion (arrow 19) in adjustment gear 16 correspondingly urges the headlamp or other object attached to the distal end of the adjustment gear 32.

Upon achieving a desired adjustment using the adjustment mechanism 12, the adjustment is retained by the above-described structure, which produce prevailing torque to resist accidental, vibrational or other movement of the desired adjustment. The present invention as illustrated above utilizes a minimum number of components thereby reducing the number of components to be manufactured, monitored, warehoused and assembled, minimizing both the relative cost and potential for failure of the adjustment mechanism.

While particular embodiments of the present invention have been shown and described in detail, it will be obvious to those skilled in the art that changes and modifications of the present invention, in its various aspects, may be made without departing from the invention in its broader aspects, some which changes and modifications being matters of routine engineering or design, and others being apparent only after study. As such, the scope of the invention should not be limited by the particular embodiments and specific construction described herein, but should be defined by the appended claims and equivalents thereof. Accordingly, the aim of the appended claims is to cover all such changes and modifications as fall within the true spirit and scope of the invention.

The invention is claimed as follows:

1. An adjustment mechanism for a headlamp or the like, said adjustment mechanism having a pair of bevel gears with intermeshing teeth for transforming rotational force exerted on a drive member operatively attached to a drive gear of said pair of bevel gears to rotate an adjustment gear of said pair of bevel gears which generally linearly moves a threaded adjustment member operatively coupled with said adjustment gear, said adjustment mechanism comprising; a housing member having formed therein a first gear receiving chamber and a second gear receiving chambers, said first and said second gear receiving chambers generally intersecting within said housing member; said drive gear being positioned in said first gear receiving chamber and cooperatively engaging said adjustment gear which is positioned in said second gear receiving chamber, wherein one of said pair of bevel gears is a plastic gear and the other of said pair of bevel gears is metal said plastic gear having teeth thereon that are integrally formed having a circumferential width that is significantly greater than the circumferential width of the teeth on said metal bevel gear member, such that said integrally formed teeth on the plastic gear can withstand the load and deflection forces imposed thereon by the metal gear teeth.

2. An adjustment mechanism according to claim 1 wherein said drive gear is formed of metal and said adjustment gear is a one piece member integrally formed of plastic.

3. An adjustment mechanism according to claim 2 further comprising a bore formed through said plastic adjustment gear for receiving said threaded adjustment member, plastic material of the adjustment gear lining said bore provides prevailing torque when threadedly engaged by said adjustment member threadedly inserted therethrough.

4. An adjustment mechanism according to claim 1 wherein said bevel gears are miter gears.

5. An adjustment mechanism according to claim 1 wherein said drive gear is formed with a complementary drive member receiving receptacle for receiving and retaining said drive member in operative engagement with said drive gear, such that upon application of a rotational torque to said drive member said drive gear engaged therewith is complementarily rotated.

6. An adjustment gear according to claim 1 wherein the circumferential width of the teeth on said plastic gear is at least one and a half times the width of the metal gear teeth.

7. An adjustment mechanism according to claim 1 wherein said plastic gear includes a bushing portion and a rim portion, said gear teeth being integrally formed with and connected to said bushing and rim portions, and said bushing portion extending axially and said rim portion extending radially from said bushing portion, said teeth being formed with buttress portions sloping outwardly towards said bushing portion for resisting load and deflection forces imposed upon said plastic gear.

8. An adjustment mechanism according to claim 1 further comprising a drive gear cap formed for covering said first gear chamber for protecting said drive gear disposed therein from undesirable environmental elements and effects, said drive gear cap being formed with a drive member aperture through which said drive member operatively projects; and an adjustment gear cap formed to cover said second chamber for protecting said adjustment gear disposed therein from undesirable environmental elements and effects, said adjustment gear cap being formed with an adjustment member aperture through which said adjustment member operatively projects and generally linearly moves.

9. An adjustment mechanism according to claim 8 including drive member securing means comprising an annular groove formed on one of an outside surface of said drive member and an internal surface of the drive member aperture formed in said drive gear cap and a cooperatively mating annular ring formed on the other of said outside surface of said drive member and said internal surface of said drive member aperture for retaining said drive member in operative engagement with said drive member receptacle non-adhesively retaining said drive member in engagement with said drive member receptacle formed in said drive gear.

10. An adjustment mechanism according to claim 8 in which said drive gear cap is formed with a hub projecting inwardly towards said drive gear when said drive gear cap is attached to said housing member, said hub having formed therethrough a portion of said drive member aperture permitting insertion of said drive member through said drive member aperture to engage said drive gear, said drive gear being formed with a hub receiving bore which cooperatively mates with said drive gear cap hub.

11. An improvement in an adjustment mechanism for a headlamp or the like operatively mounted thereto which uses a pair of bevel gears with intermeshing teeth to transform rotational force exerted on a drive member associated with a drive gear of said pair of bevel gears to rotate an adjustment gear of said pair of bevel gears creating generally linear motion in a threaded adjustment member which is operatively coupled with said adjustment gear, said improvement comprising: forming said adjustment gear of a plastic material and providing a bore therethrough which has a smaller effective inner dimension than the threads as said threaded adjustment member, such that engagement of the threaded adjustment member in said bore in the plastic adjusting gear will displace the plastic material of said bore thereby creating a movement-resisting prevailing torque between said adjustment gear and said adjustment member for retaining a desired relative positional adjustment thereof.

12. An adjustment mechanism according to claim 11 wherein said drive gear is formed of metal and said adjustment gear is a one-piece member integrally formed of plastic the teeth on said plastic adjustment gear having a circumferential width that is significantly greater than the width of the teeth on said metal gear.

13. An adjustment mechanism according to claim 12 wherein said plastic gear includes a bushing portion and a rim portion, said gear teeth being integrally formed with and connected to said bushing and rim portions to provide the plastic teeth of the adjusting gear member with sufficient strength to withstand the forces imposed thereon by the metal drive gear.

14. An adjustment mechanism according to claim 11 wherein said mechanism includes a housing member, said housing member being formed with a first and second gear receiving chamber, said drive gear being operatively disposed in said first gear chamber and said adjustment gear being operatively disposed in said second gear chamber, said first and second gear chambers being formed to intersect in said housing member of permitting said drive gear and said adjustment gear to engage therein; further comprising a drive gear cap formed for covering said first gear chamber for protecting said drive gear disposed therein from undesirable environmental elements and effects, said drive gear cap being formed with a drive member aperture through which said drive member operatively projects.

15. An adjustment mechanism according to claim 14 in which said drive gear cap includes a hub formed on a surface of said drive gear cap facing said first gear bore, said hub projecting inwardly towards said drive gear and having formed therethrough a portion of said drive member aperture permitting projecting of said drive member through said drive member aperture to engage said drive gear, a hub receiving bore formed in an abutting surface of said drive gear for cooperatively mating with said drive gear cap hub.

16. An adjustment mechanism according to claim 11 wherein said drive gear and said adjustment gear are formed with cooperatively meshing gear teeth, the adjustment gear teeth being formed larger than the drive gear teeth for withstanding load and deflection forces exerted thereupon when said drive member exerts a torque on said bevel gears, a bushing portion extending axially and a rim portion extending radially from said bushing portion, said adjustment gear teeth being integrally formed with and connected to said bushing portion and said rim portion of said adjustment gear, said teeth being formed with buttress portions sloping outwardly towards said bushing portion to provide support for resisting load and deflection forces exerted thereupon.

17. An adjustment mechanism according to claim 11 wherein said bevel gears are miter gears.

18. An improvement in an adjustment mechanism for a headlamp or the like operatively mounted thereto employing a pair of bevel gears with intermeshing teeth for transforming rotational forces exerted on a drive member associated with a drive gear of said pair of bevel gears to rotate an adjustment gear of said pair of bevel gears creating generally linear motion in a threaded adjustment member which is operatively coupled with said adjustment gear, said mechanism including a housing member, said housing member being formed with first and second gear receiving chambers, said drive gear being operatively disposed in said first gear bore and said adjustment gear being operatively disposed in second gear receiving chamber, said first and second gear receiving chambers being formed to intersect in said housing member for engaging said drive gear and said adjustment gear disposed therein, said improvement comprising: forming one of said pair of bevel gears of plastic for creating a movement-resisting prevailing torque between said adjustment gear and said adjustment member for retaining a desired relative positional adjustment thereof; a drive gear cap formed for covering said first gear receiving chamber for protecting said drive gear disposed therein from undesirable environmental elements and effects, said drive gear cap being formed with a drive member aperture through which said drive member operatively projects, said drive gear cap including a hub formed on a surface of said drive gear cap facing said first gear receiving chamber, said hub projecting inwardly towards said drive gear and having formed therethrough a portion of said drive member aperture permitting passage of said drive member through said drive member aperture to engage said drive gear, a hub receiving bore formed in an abutting surface of said drive gear for cooperatively mating with said drive gear cap hub.

19. An adjustment mechanism for a headlamp or the like employing a pair of bevel gears for transforming a rotational force applied thereto to produce a generally linear force to adjust said headlamp, said adjustment mechanism retaining a desired adjustment against unintentional adjustment of said headlamp due to the impact, vibration and the like, said adjustment mechanism comprising: a housing member having formed therein first and second gear receiving chambers, said first and second gear receiving chambers formed proximate each other at an intersecting position; a toothed drive gear rotatably retained in said first gear chamber; an adjustment gear rotatably retained in said second gear chamber; said adjustment gear being formed of a plastic material with teeth formed thereon for complementary engagement with said drive gear said teeth formed on said adjustment gear having a length greater than said teeth formed on said drive gear; said adjustment gear being formed with a bushing portion and an attached rim portion radially extending from said bushing portion with said adjustment gear teeth being formed integral with and between an outer surface of said bushing portion and an adjoining surface of said rim portion, and said teeth being formed for withstanding shear and deflection load forces exerted thereupon by said drive gear.

20. An adjustment mechanism according to claim 19 wherein said adjustment gear has a bore formed axially extending therethrough; an threaded elongate adjustment member axially projection through said bore formed axially through said adjustment gear, said adjustment member being adapted for operative attachment to said headlamp; said bore axially extending through said adjustment gear being defined by said thread on the adjustment member and engaging said adjustment member projecting therethrough creating an adjustment retaining prevailing torque for preventing involuntary movement of said headlamp in retaining a desired adjustment thereof.

21. An adjustment mechanism according to claim 20 wherein said bore axially formed through said adjustment gear is formed with a polygonal cross-section for increasing the prevailing torque formed on said adjustment member.

22. An adjustment mechanism according to claim 19 wherein said teeth on said adjustment gear have a circumferential width that is at least one and a half times greater than the width of the drive gear teeth.

23. An adjustment mechanism according to claim 19 wherein a base portion of each tooth is integrally formed with said outer surface of said bushing portion and said adjoining surface of said rim portion, said base portion being generally broad and having sloped side portions tapering upwardly into a generally flat tooth crest; a buttress portion being integrally formed on each tooth distal said rim portion and extending radially from said outer surface of said bushing portion for providing additional support for resisting shear and deflection forces exerted thereon when in driving engagement with said drive gear.

* * * * *

UNITED STATES PATENT AND TRADEMARK OFFICE
CERTIFICATE OF CORRECTION

PATENT NO. : 4,939,945

DATED : July 10, 1990

INVENTOR(S) : Francis E. Ryder and Stephen P. Lisak

It is certified that error appears in the above-identified patent and that said Letters Patent is hereby corrected as shown below:

Column 1, Line 18  " often," it should be  —Often, —

Column 1, Line 28  "types fo adjusting" it should be — types of adjusting —

Column 2, Line 32  " recepatacle " it should be — receptacle —

Column 3, Line 31  " orgainization " it should be — organization —

Column 3, Line 68  " mecahanism " it should be — mechanism —

Column 4, Line 61  " a dirve gear " it should be — a drive gear —

Column 7, Line 26  " a touch bevel" it should be — a tooth bevel —

Column 7, Line 32  "Additional," it should be — Additionally, —

Column 7, Line 59  " the busing 50." it should be — the bushing 50. —

Column 8, Line 5  " emobodiment," it should be — embodiment, —

Column 8, Line 58  " the drive gear 32" it should be — the drive gear 30 —

Column 9, Line 28  " Aternative" it should be — Alternative —

Column 14, Line 5  " member of" it should be — member for —

Column 16, Line 3  " an theaded" it should be — a threaded —

UNITED STATES PATENT AND TRADEMARK OFFICE
CERTIFICATE OF CORRECTION

PATENT NO. : 4,939,945

DATED : July 10, 1990

INVENTOR(S) : Francis E. Ryder and Stphen P. Lisak

It is certified that error appears in the above-identified patent and that said Letters Patent is hereby corrected as shown below:

Column 16, Line 4 "axially projection" it should be --axially projecting--.

Signed and Sealed this

Twenty-fifth Day of August, 1992

Attest:

DOUGLAS B. COMER

*Attesting Officer*          Acting Commissioner of Patents and Trademarks